United States Patent [19]
Jo et al.

[11] Patent Number: 6,016,218
[45] Date of Patent: Jan. 18, 2000

[54] OPTICAL FIBER AMPLIFIER

[75] Inventors: Sung Chil Jo, Kyungki-do; Bong Su Choi, Incheon, both of Rep. of Korea

[73] Assignee: Daewoo Telecom Ltd., Icheon, Rep. of Korea

[21] Appl. No.: 08/999,324

[22] Filed: Dec. 29, 1997

[30] Foreign Application Priority Data

Dec. 31, 1996 [KR] Rep. of Korea ............... 96-78489
Dec. 31, 1996 [KR] Rep. of Korea ............... 96-78527

[51] Int. Cl.$^7$ .......................... H01S 3/094; G02B 6/28
[52] U.S. Cl. .................. 359/341; 359/134; 359/160; 372/6
[58] Field of Search .................. 359/134, 160, 359/161, 184, 337, 341, 345; 372/6

[56] References Cited

U.S. PATENT DOCUMENTS

| | | | |
|---|---|---|---|
| 5,140,456 | 8/1992 | Huber | 359/341 |
| 5,185,826 | 2/1993 | Delavaux | 385/24 |
| 5,218,608 | 6/1993 | Aoki | 372/6 |
| 5,696,615 | 12/1997 | Alexander | 359/134 |
| 5,745,283 | 4/1998 | Inagaki et el. | 359/341 |
| 5,808,786 | 9/1998 | Shibuya | 359/341 |

FOREIGN PATENT DOCUMENTS

508149 A2  10/1992  European Pat. Off. .

OTHER PUBLICATIONS

Becker et al., IEEE Photonics Technology Letters, vol. 2, #1, pp. 35–37, Jan. 1990.
Aoki et al, IOOC–CCOC 1991 Arf. pp. 585–587, Sep. 12, 1991.
Mutsuda et al, IEICE, Spring Convention, paper. No. 4, C–297, pp. 1–5, 1993.
Delavaux et al, Electronics Letters, vol. 28, #7, pp. 1642–1643; Aug. 13, 1992.

*Primary Examiner*—Nelson Moskowitz
*Attorney, Agent, or Firm*—Bruce E. Lilling

[57] ABSTRACT

An optical fiber amplifier is disclosed including: an optical line through which an optical signal is transmitted; a rare-earth-doped fiber, doped with a predetermined rare earth ion, being set on the optical line; a pumping light beam source for generating a pumping light beam having a predetermined wavelength; a first multiplexer for coupling the pumping light beam to the optical line; a second multiplexer for dividing the pumping light beam outputted from the rare-earth-doped fiber; and pumping light beam looping means for looping the pumping light beam divided by the second multiplexer back to the rare-earth-doped fiber. The residual pumping light beam outputted from the rare-earth-doped pumping light beam is looped back by the feedback loop or reflection loop, to be reprovided to the rare-earth-doped fiber through the multiplexer. Accordingly, it is possible to reduce the length of the rare-earth-doped fiber remarkable, compared to the conventional case, and prevent the residual pumping light from being transmitted through the optical line.

19 Claims, 9 Drawing Sheets

OPTICAL FIBER AMPLIFIER

BACKGROUND OF THE INVENTION

1. Field of the Invention

The present invention relates to an optical fiber amplifier for amplifying optical signals, specifically, to an optical fiber amplifier which can reduce the amount of active fiber which constructs the optical fiber amplifier, and improve the amplification efficiency as well, by looping a pumping light beam used as an exciting signal in a rare-earth-doped fiber back to the rare-earth-doped fiber through a feedback loop or reflection loop.

2. Discussion of Related Art

Optical communication techniques transmitting information through optical fibers have been developed and are widely being used. The optical communication techniques, which can transmit large amount of information at high speed, are applied for information communications between countries through submarine cables because they do not suffer from signal disturbance or crosstalk due to electromagnetic induction. As multiplex and network techniques for the optical communications have been developed recently, the optical communication techniques gradually enlarge the range of their use to the key communication networks for high-speed broadband multimedia communications including voice and data communications between switches, cable TV or video on demand (VOD).

The optical communication techniques have been improved according to the development of optical signal amplifiers which provide high-speed optical signal transmission and superlong-distance transmission. Recently, there have been actively carried out researches about amplifiers having flat gain wavelength, which is used in wavelength multiplex, and high-gain amplifiers for image distribution techniques.

An early optical signal amplifier converts an optical signal into an electric signal through an avalanche-type photodiode to amplify, and reconverts the amplified electric signal into the optical signal using a laser diode. Present optical signal amplifiers employ rare-earth-doped fibers so that the signal conversion process for optical signal amplification can be omitted. The aforementioned rare-earth-doped fiber is formed in a manner that an active optical fiber is doped with a rare earth ion such as Er, Pr and Nd. When a pumping light beam having a predetermined wavelength is supplied to the rare-earth-doped fiber, stimulated photon having a predetermined wavelength is emitted due to excitation of the rare earth ion, which amplifies the optical signal propagated through a corresponding optical fiber ultimately.

FIG. 1 shows a configuration of a conventional optical fiber amplifier using the rare-earth-doped fiber. Referring to FIG. 1, an optical signal S is coupled to a first optical line 1, and a pumping light beam P is coupled to a second optical line 2, first and second optical lines 1 and 2 being coupled to a multiplexer 3 as its inputs. A third optical line 4 corresponding to the output of multiplexer 3 is connected to a fourth optical line 7 which is the output line, through a rare-earth-doped fiber 5 and isolator 6. In this configuration, optical signal S and pumping light beam P applied through first and second optical lines 1 and 2 respectively are coupled with each other by multiplexer 3 so that they are included together in third optical line 4 corresponding to the output of multiplexer 3.

Optical signal S and pumping light beam P are applied to the rare-earth-doped fiber 5 where pumping light beam P excites rare earth ions doped thereinto, to generate stimulated photon having a predetermined wavelength. This light is introduced into optical signal S and effects optical amplification. Isolator 6 prevents opposite optical signals from being introduced into rare-earth-doped fiber 5, which proceed in a direction opposite to optical signal S and include, for example, pumping light beam from another rare-earth-doped fiber located in the following stage or reflection signal of optical signal S.

The maximum output power of the optical fiber amplifier is determined, depending on the dopant doped into the optical fiber, concentration of the dopant, the length of the doped optical fiber, the wavelength of pumping light, and the output of pumping light. As the optical fiber doped with the rare earth ion is very expensive, it requires to be shortened. However, when the rare-earth-doped fiber becomes shorter, amplification of the optical signal is not sufficiently carried out, and thus an optimum optical signal cannot be obtained.

Furthermore, the pumping light beam as an exciting light in the rare-earth-doped fiber corresponds to a noise signal in terms of the optical signal transmitted through the fiber. Accordingly, to prevent a residual pumping light, which is not consumed but left in the rare-earth-doped fiber, from being transmitted through the optical fiber, the conventional optical fiber amplifier includes a reflection mirror at its output terminal to reflect the pumping light beam. However, the reflection mirror reflects not only the pumping light beam outputted from the rare-earth-doped fiber but also a portion of the optical signal transmitted through the optical fiber. Thus, it may deteriorate the output level of the optical signal.

SUMMARY OF THE INVENTION

Accordingly, the present invention is directed to an optical fiber amplifier which substantially obviates one or more of the problems due to limitations and disadvantages of the related art.

An object of the present invention is to provide an optical fiber amplifier which remarkably reduces the length of an rare-earth-doped fiber used therein.

A further object of the present invention is to provide an optical fiber amplifier which prevents a residual pumping light beam from being outputted from the optical fiber amplifier, without using a reflection mirror.

Another object of the present invention is to provide an optical fiber amplifier which enhances the efficiency of the electric power used by optimizing its amplification efficiency.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To accomplish the objects of the invention, an optical fiber amplifier according to a first aspect of the present invention includes: an optical line through which an optical signal is transmitted; a rare-earth-doped fiber, doped with a predetermined rare earth ion, being set on the optical line; a pumping light beam source for generating a pumping light beam having a predetermined wavelength; a first multiplexer for coupling the pumping light beam to the optical line; a second multiplexer for dividing the pumping light beam outputted through the rare-earth-doped fiber; and pumping light beam feedback means for looping a portion of the divided pumping light beam back to the rare-earth-doped fiber.

A further optical fiber amplifier according to the first aspect of the present invention includes: a first optical line through which an optical signal is transmitted; a rare-earth-doped fiber, doped with a predetermined rare earth ion, being set on the optical line; a first pumping light beam source for generating a first pumping light beam having a predetermined wavelength; a second pumping light beam source for generating a second pumping light beam having a predetermined wavelength; a first multiplexer for coupling the first pumping light beam to the optical signal transmitted through the optical line, the first pumping light beam and optical signal being transmitted in the same direction; a second multiplexer for coupling the second pumping light beam to the optical signal transmitted through the optical line, the second pumping light beam being transmitted in a direction opposite to the optical signal; a third multiplexer for dividing the pumping light beam which is outputted through the rare-earth-doped fiber and transmitted in the same direction as the optical signal; a fourth multiplexer for dividing the pumping light beam which is outputted through the rare-earth-doped fiber and transmitted in a direction opposite to the optical signal; and a second optical line optically coupled to the third and fourth multiplexers, in which the third and fourth multiplexers output the divided pumping light beam through the second optical line, and couple the pumping light beam received through an optical line to the first optical line.

Another optical fiber amplifier according to the first aspect of the invention further includes feedback pumping light beam detection means for detecting the amount of the pumping light beam looped back by the feedback loop, and control means for controlling the output level of the first and second pumping light beam sources on the basis of the amount of the pumping light beam detected by the feedback pumping light beam detection means.

To accomplish the objects of the invention, an optical fiber amplifier in accordance with a second aspect of the invention includes: an optical line through which an optical signal is transmitted; a rare-earth-doped fiber, doped with a predetermined rare earth ion, being set on the optical line; a pumping light beam source for generating a pumping light beam having a predetermined wavelength; a first multiplexer for coupling the pumping light beam to the optical line; and pumping light beam looping means for dividing the pumping light beam outputted from the rare-earth-doped fiber, and providing it to the rare-earth-doped fiber again.

A further optical fiber amplifier in accordance with the second aspect of the invention includes: an optical line through which an optical signal is transmitted; a rare-earth-doped fiber, doped with a predetermined rare earth ion, being set on the optical line; a first pumping light beam source for generating a first pumping light beam having a predetermined wavelength; a second pumping light beam source for generating a second pumping light beam having a predetermined wavelength; a first multiplexer for coupling the first pumping light beam to the optical signal transmitted through the optical line, the first pumping light beam and optical signal being transmitted in the same direction; a second multiplexer for coupling the second pumping light beam to the optical signal transmitted through the optical line, the second pumping light beam being transmitted in a direction opposite to the optical signal; first pumping light beam looping means for dividing the pumping light beam which is outputted through the rare-earth-doped fiber and transmitted in the same direction as the optical signal, and providing it to the rare-earth-doped fiber again; and second pumping light beam looping means for dividing the pumping light beam which is outputted through the rare-earth-doped fiber and transmitted in a direction opposite to the optical signal, and providing it to the rare-earth-doped fiber again.

Another optical fiber amplifier of the second aspect of the invention further includes at least one pumping light beam detection means for detecting the amount of the pumping light beam reflected by the reflection loop, and control means for controlling the output level of the first and second pumping light beams sources on the basis of the amount of the pumping light beam detected by the pumping light beam detection means.

According to the present invention as constructed as above, the residual pumping light beam outputted from the rare-earth-doped fiber is coupled to the feedback loop or reflection loop through the multiplexer, and the residual pumping light beam looped back by the feedback loop or reflection loop is reprovided to the rare-earth-doped fiber by the multiplexer. Accordingly, it is possible to reduce the length of the rare-earth-doped fiber remarkably compared to the conventional case, and prevent the pumping light beam from being transmitted through the optical fiber. Furthermore, as the control means controls the output of the pumping light beam source on the basis of a monitor signal supplied from the feedback pumping light beam feedback means, it is also possible to control the amplification efficiency of the optical fiber amplifier in an optimum state.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention:

DETAILED DESCRIPTION OF PREFERRED EMBODIMENT

Reference will now be made in detail to the preferred embodiments of the present invention, examples of which are illustrated in the accompanying drawings.

Figure 1:
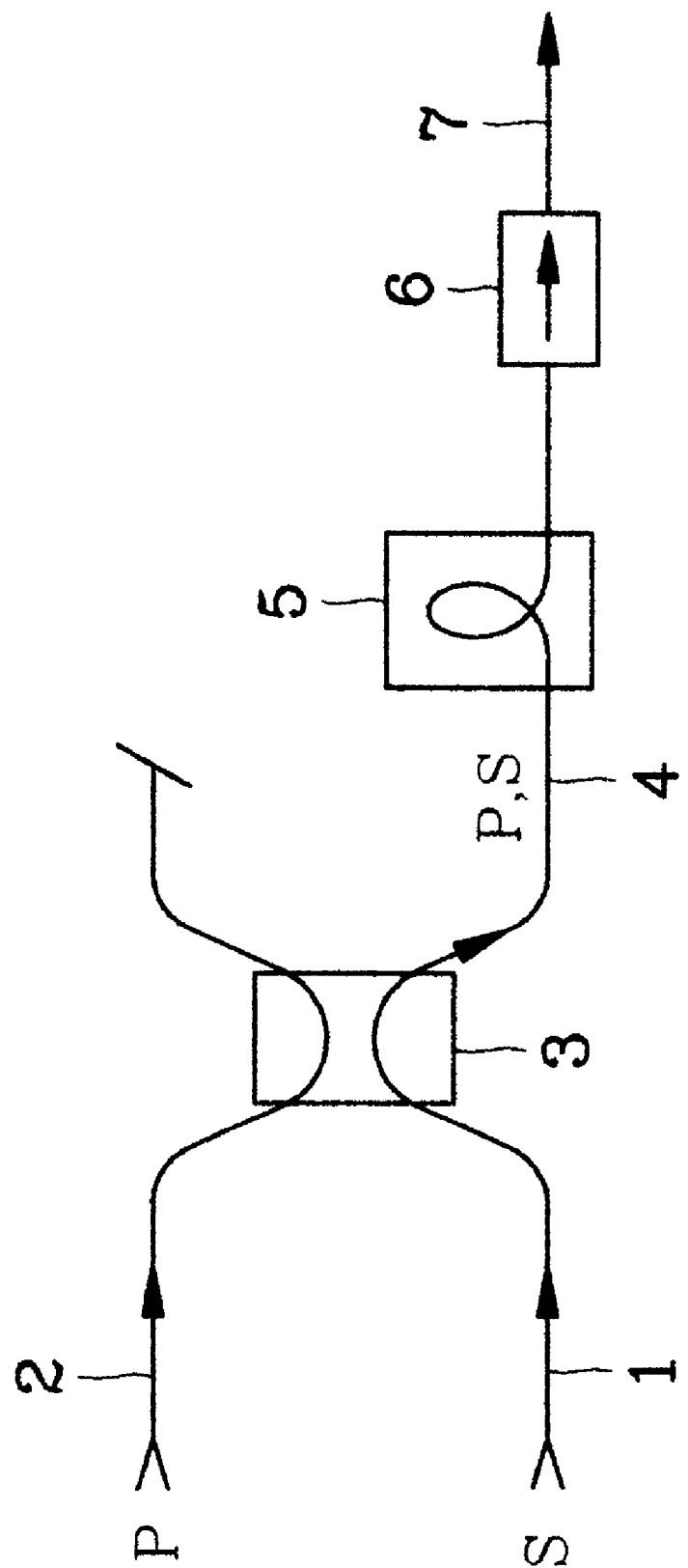
FIG. 1 shows a configuration of a conventional prior art optical fiber amplifier.
Figure 2:
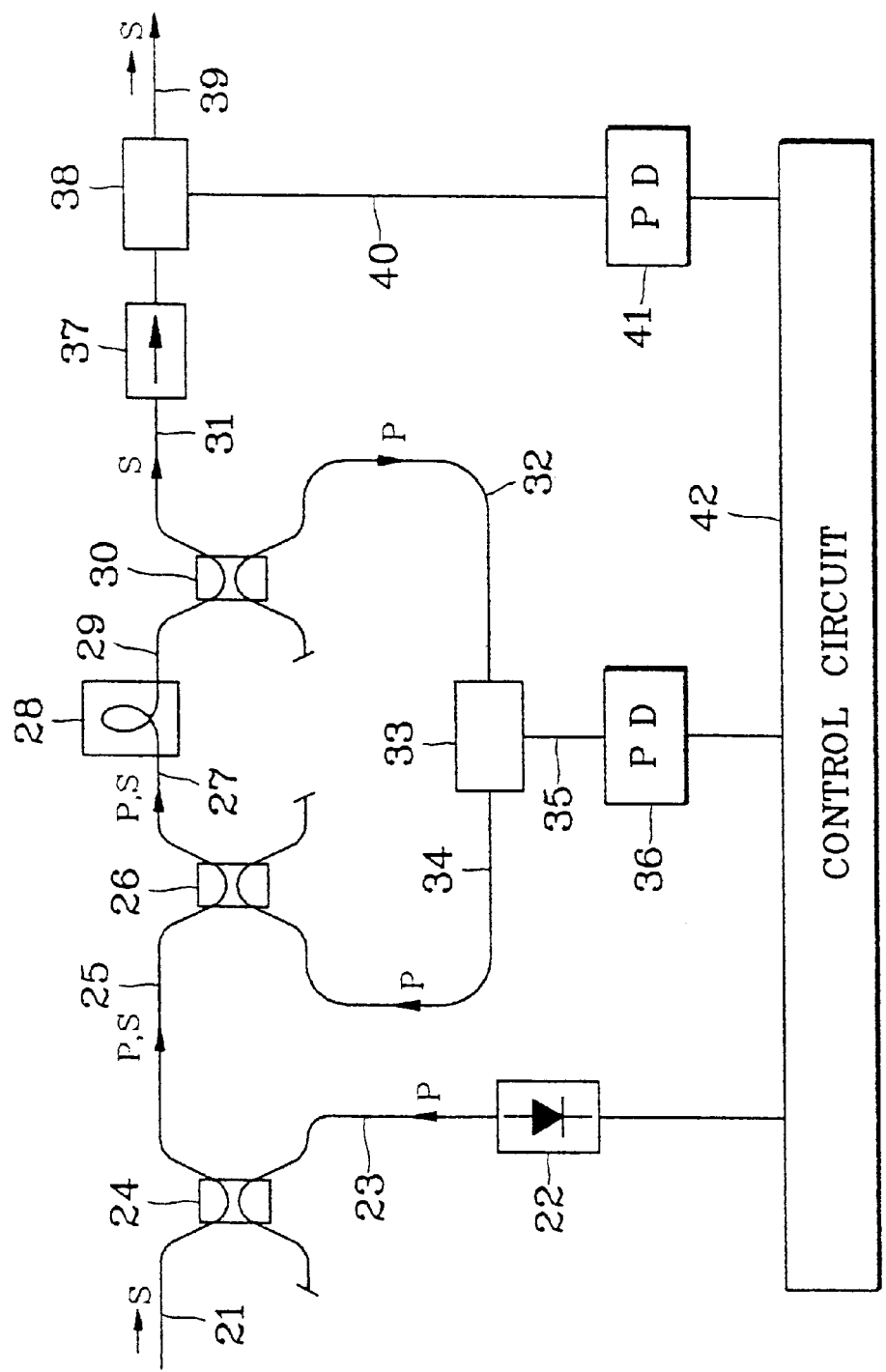
FIG. 2 shows a configuration of an optical fiber amplifier including a pumping light beam feedback loop according to a first embodiment of a first aspect of the present invention.

FIG. 2 shows a configuration of an optical fiber amplifier including a pumping light beam feedback loop according to a first embodiment of a first aspect of the present invention, which employs a feedback loop as looping means of the pumping light beam. Referring to FIG. 2, an input optical signal S is coupled to a first optical line 21, and a pumping light beam P generated by a laser diode 22 is coupled to a second optical line 23. First and second optical lines 21 and 23 are provided to a first wavelength division multiplexer 24 as its inputs. Here, optical signal S has a wavelength of 1520 to 1570 nm, for example, and pumping light beam P has a wavelength of 980 nm or 1480 nm. The output power of laser diode 22 is determined by operation current supplied from a control circuit 42.

First multiplexer 24 couples optical signal S with pumping light beam P and sends them to a second wavelength division multiplexer 26 through a third optical line 25 coupled to one input of second multiplexer 26. Second wavelength division multiplexer 26 couples optical signal S and pumping light beam P with feedback pumping light beam P received from an eighth optical line 34 which will be explained below, and sends them to a rare-earth-doped fiber 28 through a fourth optical line 27 which is connected to rare-earth-doped fiber 28 as its input. Fiber 28 is doped with a rare earth ion, for example, Er, and its length is set to, for example, half the rare-earth-doped fiber in the conventional optical fiber amplifier. The length of fiber 28 is not fixed to a specific one but depends on the wavelength or the power of pumping light beam P generated by laser diode 22.

The output light beam from rare-earth-doped fiber 28 is coupled to a fifth optical line 29 which is connected to a third wavelength division multiplexer 30. Here, since rare-earth-doped fiber 28 is remarkably shortened, compared to the conventional fiber, if the power of pumping light beam P generated by laser diode 22 is similar to that in the conventional optical fiber amplifier, pumping light beam P will remain on fifth optical line 29 together with optical signal S. Third multiplexer 30 divides optical signal S and pumping light beam on the basis of their wavelengths and couples them to sixth and seventh optical lines 31 and 32, respectively.

Pumping light beam P propagated through seventh optical line 32 is coupled to eighth optical line 34 through a first tap coupler 33, eighth optical line 34 being connected to the other input of second multiplexer 26. Here, seventh and eighth optical lines 32 and 34 construct a feedback loop for the residual pumping light beam outputted from rare-earth-doped fiber 28. First tap coupler 33 divides pumping light beam P applied from seventh optical line 32 in a predetermined ratio, for example, 99:1, and couples each of divided portions of the pumping light beam to eighth optical line 34 and a ninth optical line 35, respectively. First photodiode 36 photoelectric-converts the pumping light beam applied through ninth optical line 35 to supply to control circuit 42 as a monitor signal.

Optical signal S coupled to sixth optical line 31 by third multiplexer 30 is coupled to a second tap coupler 38 through an isolator 37 which blocks a reflective optical signal. Second tap coupler 38 divides optical signal S in a predetermined ratio, for example, 99:1, and couples each of divided portions to tenth and eleventh optical lines 39 and 40, respectively. The portion of optical signal S coupled to tenth optical line 39 is transmitted as an output signal, and portion of optical signal S coupled to eleventh optical line 40 is photoelectric-converted by a second photodiode 41 and applied to control circuit 42 as a monitor signal.

Control circuit 42 controls the amount of operation current supplied to laser diode 22 on the basis of the monitor signals applied through first and second photodiodes 36 and 41. That is, control circuit 42 can control the optical fiber amplifier in an optimum state, by reducing the amount of the operation current supplied to laser diode 22 when the level of the monitor signal from first photodiode 36 is high, and increasing the amount of the operation current when the level of the monitor signal from second photodiode 41 is low.

In the optical fiber amplifier as constructed as above, optical signal S inputted through first optical line 21 and pumping light beam P generated by laser diode 22 are coupled with each other by first multiplexer 24, to be outputted through third line 25. Optical signal S and pumping light beam P are coupled with the pumping light beam looped back by feedback loop 34 through second multiplexer 26, to be applied to rare-earth-doped fiber 28. Pumping light beam P excites the rare earth ion doped into the fiber 28 to generate stimulated photons having a predetermined wavelength which are introduced to optical signal S to be amplified. Optical signal S amplified in rare-earth-doped fiber 28 is coupled to sixth optical line 31 through third multiplexer 30, with hardly having loss, to be transmitted through isolator 37.

In this case, as the length of fiber 28 is set shorter, compared to the conventional case, pumping light beam P remains in the output light beam from rare-earth-doped fiber 28. The residual pumping light beam is wavelength-divided by third multiplexer 30 and coupled to second multiplexer 26 through the feedback loop constituted of seventh and eighth optical lines 32 and 34. Second multiplexer 26 couples the residual pumping light beam P looped back by the feedback loop to fourth optical line 27, to reprovide the pumping light beam P to rare-earth-doped fiber 28.

That is, in the above-described configuration of the optical fiber amplifier, pumping light beam P generated by laser diode 22 passes through rare-earth-doped fiber 28 at least twice through feedback loops 32 and 34. Accordingly, the length of rare-earth-doped fiber 28 can be remarkably shortened, compared to the conventional case. Furthermore, since the residual pumping light beam P outputted from rare-earth-doped fiber 28 is coupled to feedback loops 32 and 34 through third multiplexer 30, it is possible to prevent pumping light beam P from being propagated through the optical lines without using a separate reflection mirror. Moreover, control circuit 42 controls the output of laser diode 22 on the basis of the monitor signals applied from first and second photodiodes 36 and 41. Accordingly, the amplification efficiency of the optical fiber amplifier can be controlled in an optimum state.

Figure 3:
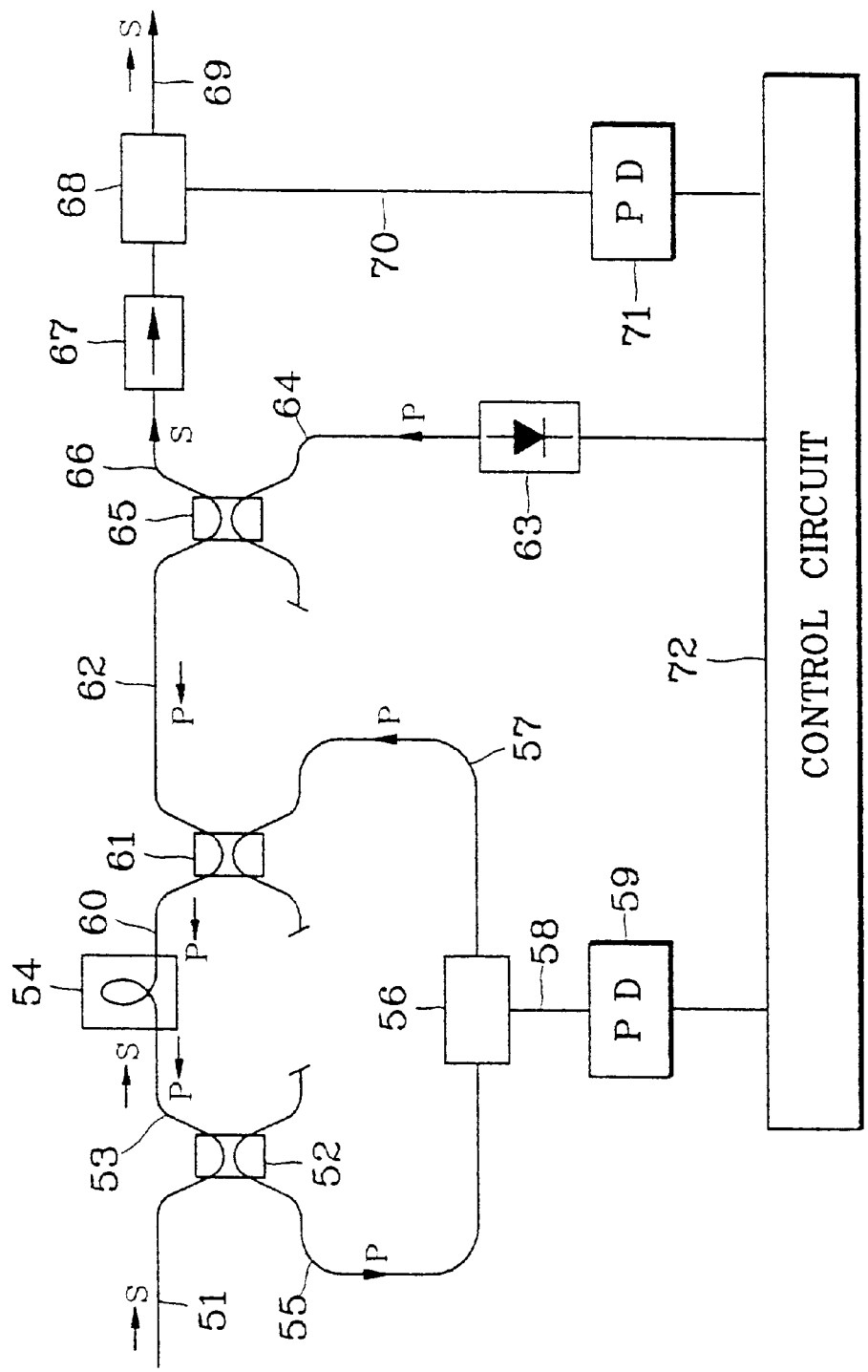
FIG. 3 shows a configuration of an optical fiber amplifier including a pumping light beam feedback loop according to a second embodiment of a first aspect of the present invention.

FIG. 3 shows a configuration of an optical fiber amplifier according to a second embodiment of the first aspect of the present invention, which employs a reverse-direction excitation mode in which pumping light beam P is provided in a opposite direction to optical signal S, in contrast to the forward-direction excitation mode of the first embodiment in which pumping light beam P and optical signal S are provided in the same direction. Referring to FIG. 3, input optical signal S is coupled to a first optical line 51 which is coupled to a first wavelength division multiplexer 52 as its one input. First multiplexer 52 couples optical signal S to a second optical line 53, and also couples a residual pumping light beam P applied from a rare-earth-doped fiber 54 through second optical line 53, to a third optical line 55.

Pumping light beam P coupled to third optical line 55 is coupled to a first tap coupler 56 which divides pumping light beam P in a predetermined ratio, for example, 99:1, and couples each of divided portions to a fourth and fifth optical lines 57 and 58, respectively. Fourth optical line 57 is connected to a second multiplexer 61 as its input, and constructs a feedback loop for the residual pumping light beam P outputted from fiber 54, together with third optical line 55. The portion of pumping light beam P coupled to fifth line 58 by first tap coupler 56 is applied to a first photodiode 59 to be photoelectric-converted, and provided to a control circuit 72 as a monitor signal.

Optical signal S coupled to second line 53 is sent to rare-earth-doped fiber 54 whose output light beam is applied to second multiplexer 61 through a sixth optical line 60. Second multiplexer 61 couples optical signal S received through sixth line 60 to a seventh optical line 62, and also couples pumping light beams P applied through seventh optical line 62 and from feedback loop 55 and 57 to the input of rare-earth-doped fiber 54 through sixth optical line 60.

In this second embodiment of the first aspect of the invention, for example, a light beam with a wavelength of 1520 to 1570 nm is used as optical signal S, and light beam with a wavelength of 980 or 1480 nm is used as pumping light beam P. The fiber 54 is doped with a rare earth ion, for example, Er ion, and its length is set to half the fiber used in the conventional optical fiber amplifier. In FIG. 3, reference numeral 63 denotes a laser diode which generates a pumping light beam P with a predetermined wavelength under the control of control circuit 72. Pumping light beam P generated from laser diode 63 is coupled to an eighth optical line 64 connected to a third multiplexer 65 as its input. Third multiplexer 65 couples optical signal S received through seventh optical line 62 to a ninth optical line 66, and also couples pumping light beam P applied from eighth optical line 64 to seventh optical line 62.

Optical signal S propagated through ninth optical line 66 is coupled to a second tap coupler 68 through an isolator 67 which blocks a reflective optical signal. Second tap coupler 68 divides optical signal S in a predetermined ratio, for example, 99:1, and couples each of the divided portions to tenth and eleventh optical lines 69 and 70, respectively. The portion of optical signal S coupled to tenth optical line 69 is transmitted as an output signal, and the portion of optical signal coupled to eleventh optical line 70 is photoelectric-converted through a second photodiode 71 and provided to control circuit 72 as a monitor signal.

Control circuit 72, similar to the first embodiment, controls the amount of operation current supplied to laser diode 63 on the basis of the monitor signals applied through first and second photodiodes 59 and 71, in such a manner that the amount of the operation current is reduced when the level of the monitor signal applied from first photodiode 59 is high, and the operation current amount is increased when the level of the monitor signal applied from second photodiode 71 is low, thereby controlling the optical fiber amplifier in an optimum state.

In the optical fiber amplifier according to the second embodiment of the first aspect of the invention, pumping light beam P generated by laser diode 63 is sent to rare-earth-doped fiber 54 through third and second multiplexers 65 and 61, and excites the rare earth ion doped into fiber 54, to generate stimulated photons with a predetermined wavelength which are introduced to optical signal S inputted through first multiplexer 52 and being transmitted through fiber 54, to amplify optical signal S.

Furthermore, since the length of rare-earth-doped fiber 54 is remarkably reduced compared to the conventional case, a predetermined amount of the pumping light beam is output- ted from fiber 54, and the residual pumping light beam is applied to feedback loop 55 and 57 through first multiplexer 52, looped back by the feedback loop, and coupled to sixth optical line 60 through second multiplexer 61, to be reprovided to rare-earth-doped fiber 54. Control circuit 72 controls the output of laser diode 63 on the basis of the monitor signals from first and second photodiodes 59 and 71. Accordingly, the electric power efficiency of the optical fiber amplifier can be optimized as well as rare-earth-doped fiber 54 can be shortened. Moreover, pumping light beam P outputted from rare-earth-doped fiber 54 is continuously reprovided thereto through feedback loop 55 and 57, it is possible to prevent the residual pumping light beam from being transmitted through the optical lines.

Figure 4:
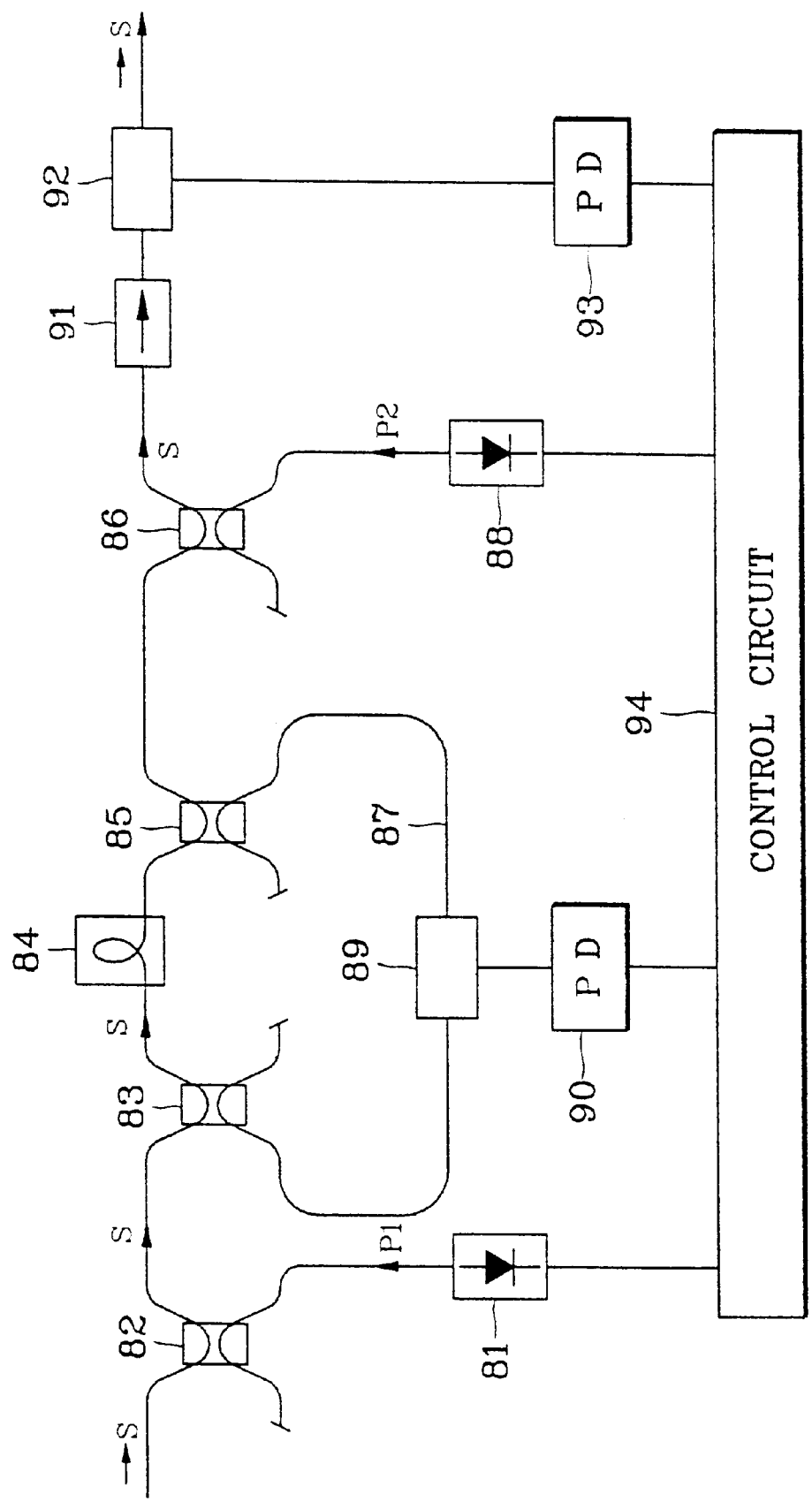
FIG. 4 shows a configuration of an optical fiber amplifier including a pumping light beam feedback loop according to a third embodiment of a first aspect of the present invention.

FIG. 4 shows a configuration of an optical fiber amplifier including a reflection loop according to a third embodiment of the first aspect of the present invention, which employs bidirectional excitation mode. Referring to FIG. 4, input optical signal S and first pumping light beam P1 generated by a laser diode 81 are coupled with each other by a first wavelength division multiplexer 82, pass through a second wavelength division multiplexer 83, with hardly having loss, and then applied to a rare-earth-doped fiber 84. The length of fiber 84 corresponds to half the rare-earth-doped fiber of the conventional optical fiber amplifier. Optical signal S outputted from rare-earth-doped fiber 84 passes through third and fourth wavelength multiplexers 85 and 86, with hardly having loss.

The residual first pumping light beam P1 outputted from rare-earth-doped fiber 84 is wavelength-divided by third multiplexer 85 and coupled to a feedback loop 87. The first pumping light beam P1 loops back to second multiplexer 83 through feedback loop 87, to be reprovided to rare-earth-doped fiber 84. A second pumping light beam P2 generated by a second laser diode 88 is coupled to the input of fourth multiplexer 86, to be supplied to rare-earth-doped fiber 84 through third multiplexer 85. The residual second pumping light beam P2 outputted from fiber 84 is wavelength-divided by second multiplexer 83, to be coupled to feedback loop 87. Then, the residual second pumping light beam P2 looped back to third multiplexer 85 by feedback loop 87 is reprovided to fiber 84.

Feedback loop 87 includes a first tap coupler 89 which divides first or second pumping light beam P1 or P2 supplied from the feedback loop 87 in a predetermined ratio, for example, 99:1, and applies a portion of the divided pumping light beam to a first photodiode 90 which photoelectric-converts the received pumping light beam and provides it to a control circuit 94 as a monitor signal. Optical signal S outputted from fourth multiplexer 86 is coupled to a second tap coupler 92 through an isolator 91 which blocks a reflective optical signal. Second tap coupler 92 divides optical signal S outputted from isolator 91 in a predetermined ratio, for example, 99:1, and applies a portion of the divided optical signal to a second photodiode 93 which photoelectric-converts the received optical signal and provides it to control circuit 94 as a monitor signal.

Control circuit 94 controls the amount of operation current supplied to first and second laser diodes 81 and 88 on the basis of the monitor signals provided through first and second photodiodes 90 and 93. That is, control circuit 94 controls the optical fiber amplifier in an optimum state, by reducing the amount of operation current supplied to first and second laser diodes 81 and 88 when the level of the monitor signal provided from first photodiode 90 is high, and increasing the operation current amount when the level of the monitor signal provided from second photodiode 93 is low.

As described above, optical signal S is applied to rare-earth-doped fiber 84 through first and second multiplexers 82 and 83. Here, as an exciting signal for rare-earth-doped fiber 84, first pumping light beam P1 generated by first laser diode 81 is provided thereto through first and second multiplexers 82 and 83, and second pumping light beam P2 generated by second laser diode 88 is also provided thereto through fourth and third multiplexers 86 and 85. First and second pumping light beams P1 and P2 have the same wavelength.

The length of rare-earth-doped fiber 84 is set shorter than that of the conventional one. Accordingly, when the outputs of first and second laser diodes 81 and 88 are as much as those of the conventional optical fiber amplifier, first and second pumping light beams P1 and P2 are not all consumed but remain in rare-earth-doped fiber 84. The residual light beams of first and second pumping light beams P1 and P2 are respectively wavelength-divided by third and second multiplexers 85 and 83 to be coupled to feedback loop 87. Then, they are looped back to third and second multiplexers 85 and 83 by feedback loop 87 to be applied to rare-earth-doped fiber 84. This feedback operation for first and second pumping light beams P1 and P2 is continuously performed when the pumping light beam is not all consumed but remains in rare-earth-doped fiber 84.

When first and second pumping light beams P1 and P2 are provided to rare-earth-doped fiber 84, stimulated photons are emitted from fiber 94 to be introduced to optical signal S being transmitted fiber 94, to amplify the optical signal. Control circuit 94 controls the amplification efficiency of the optical fiber amplifier in an optimum state, controlling the output of first and second laser diodes 81 and 90, based on the monitor signals supplied from first and second photodiodes 90 and 93.

In the third embodiment of the first aspect of the invention, the pumping light beam outputted from rare-earth-doped fiber 84 is looped back thereto by feedback loop 87. Accordingly, if the outputs of first and second laser diodes 81 and 88 are as much as those in the conventional optical fiber amplifier, the length of rare-earth-doped fiber 84 can be reduced to below half the fiber length in the conventional optical fiber amplifier. Furthermore, the residual pumping light beams P1 and P2 outputted from rare-earth-doped fiber 84 are continuously reprovided thereto, for complete consumption of the pumping light beam. Here, it is possible to set the electric power efficiency of optical fiber amplifier in an optimum state since the amount of the pumping light beam reprovided to fiber 84 is detected by first photodiode 90, and the output powers of first and second laser diodes are controlled on the basis of the detected signal.

Figure 5:
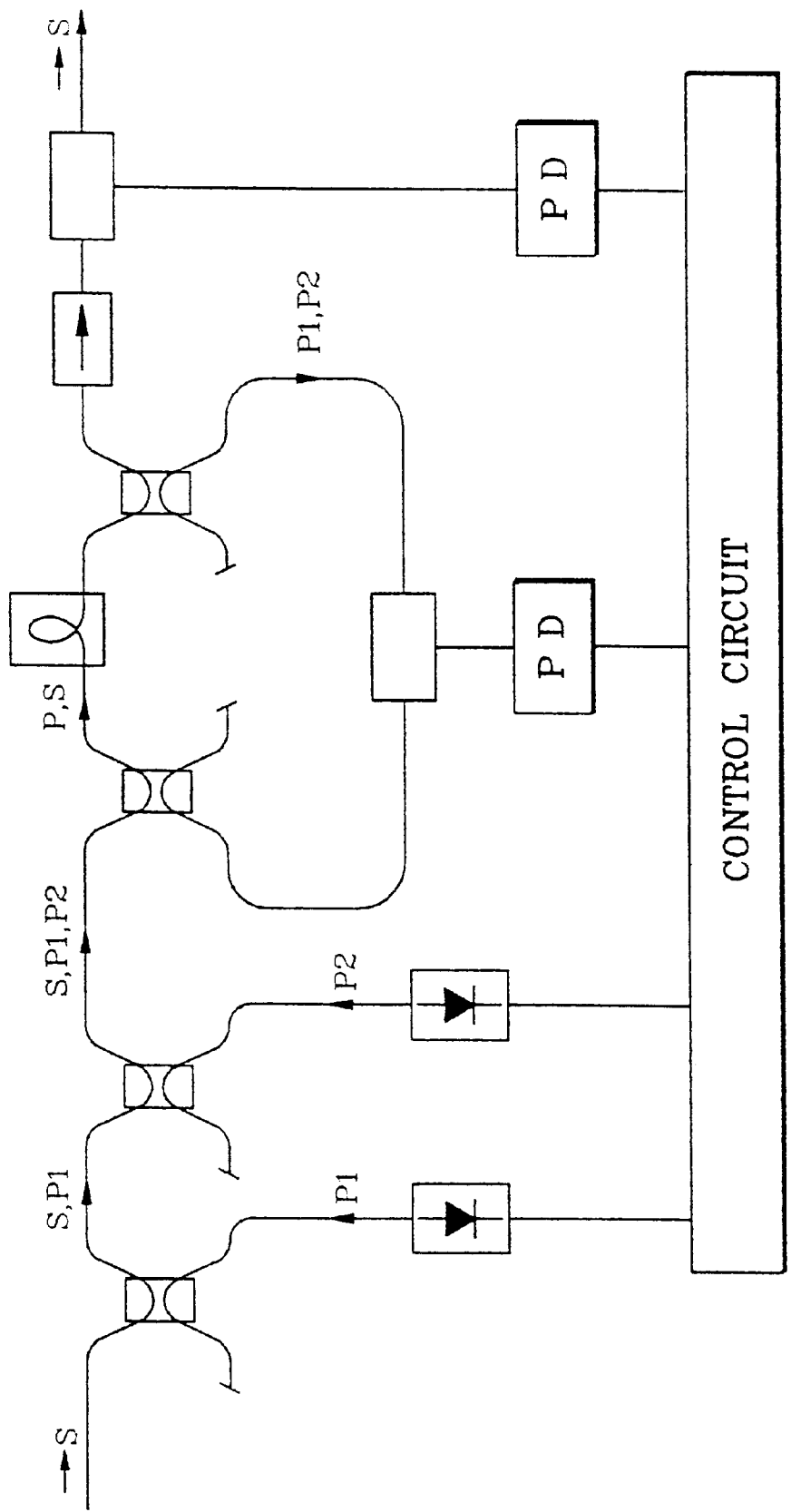
FIGS. 5 and 6 show configurations of an optical fiber amplifier including a pumping light beam feedback loop according to other embodiments of the present invention.
Figure 6:
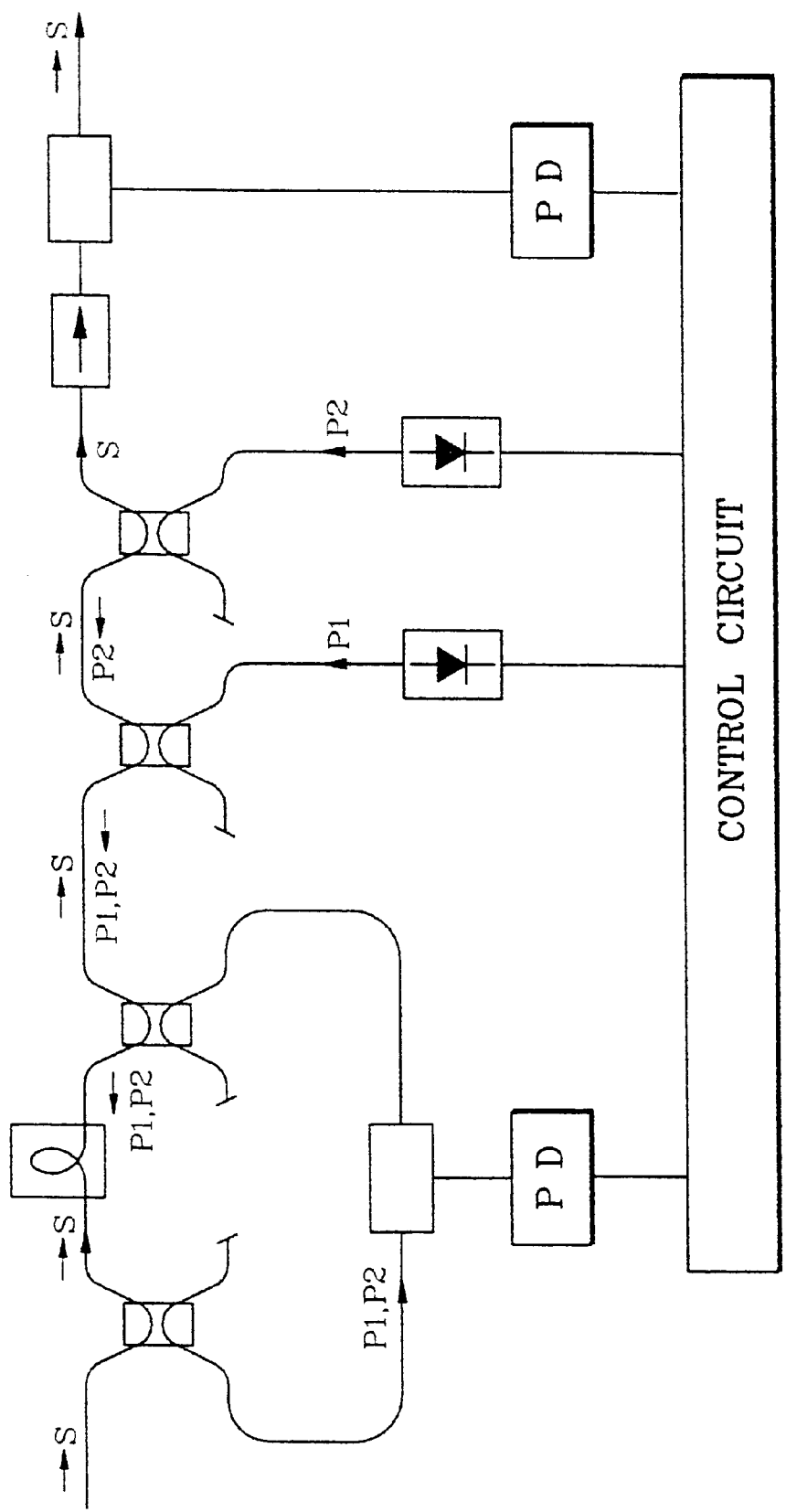

While the present invention is applied to forward-direction excitation mode and reverse-direction excitation mode using a single laser diode (pumping light source) in the embodiments shown in FIGS. 2 and 3, the invention can be also applied in the same manner to an optical fiber amplifier having a plurality of pumping light sources, as shown in FIGS. 5 and 6.

Figure 7:
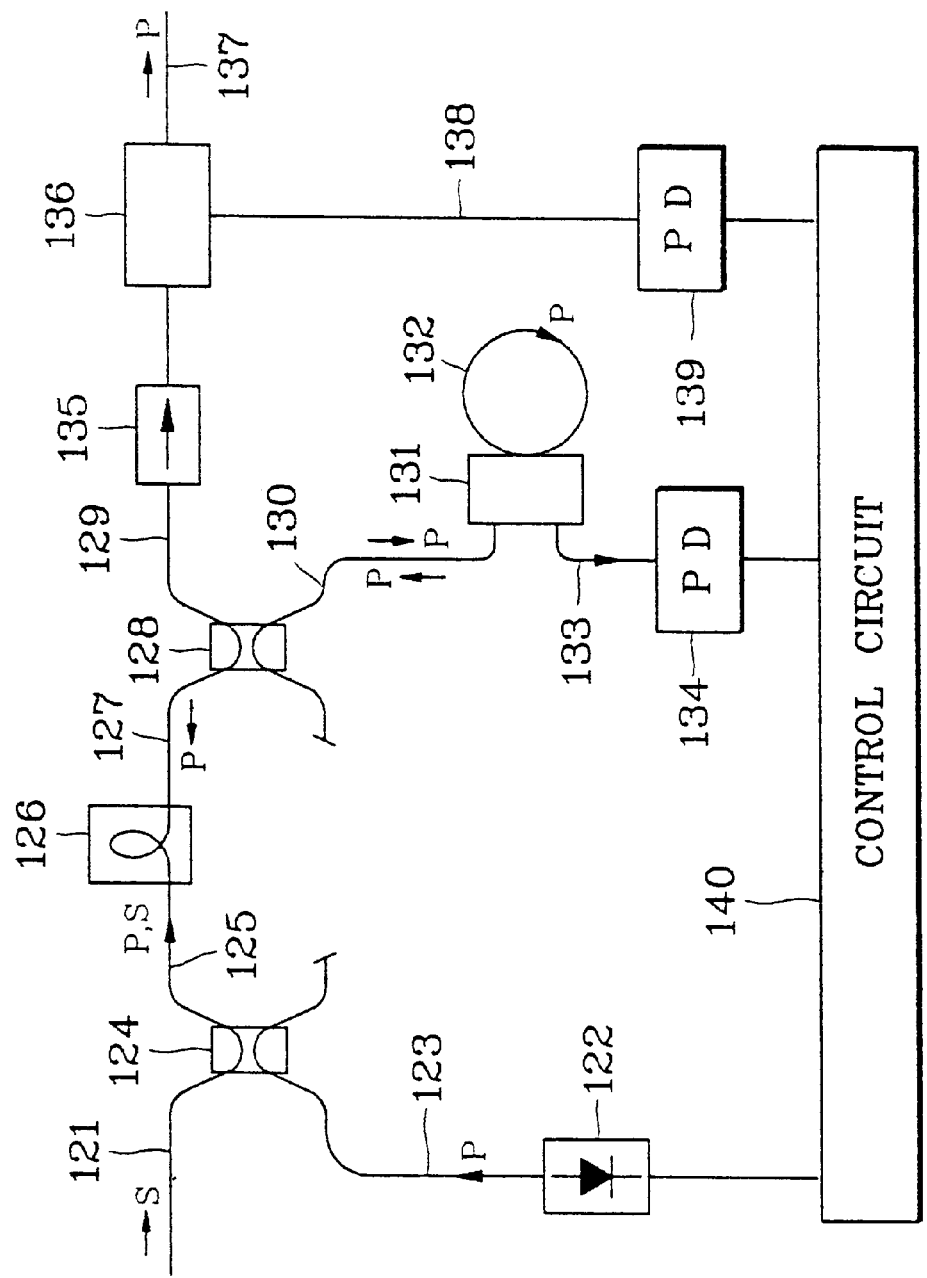
FIG. 7 shows a configuration of an optical fiber amplifier including a reflective loop according to a first embodiment of a second aspect of the present invention.

FIG. 7 shows a configuration of an optical fiber amplifier according to a first embodiment of a second aspect of the present invention, which employs a reflection loop as looping means for the pumping light beam. Referring to FIG. 7, input optical signal S is coupled to a first optical line 121, and pumping light beam P generated by a laser diode 122 is coupled to a second optical line 123. First and second optical lines 121 and 122 are provided to a first wavelength division multiplexer 124 as its inputs. Here, optical signal S has a wavelength of 1520 to 1570 nm, for example, and pumping light beam P has a wavelength of 980 nm or 1480 nm. The output power of laser diode 122 is determined by operation current supplied from a control circuit 140.

First multiplexer 124 couples optical signal S with pumping light beam P and sends them to a third optical line 125 which is coupled to a rare-earth-doped fiber 126 as its input. The rare-earth-doped fiber 126 is doped with a rare earth ion, for example, Er, and its length is set to half the fiber length in the conventional optical fiber amplifier. Here, the length of fiber 126 is not a specific one but depends on the wavelength or power of pumping light beam P generated by laser diode 122. The output light beam from rare-earth-doped fiber 126 is coupled to a fourth optical line 127 which is connected to a second multiplexer 128. Here, as described above, since rare-earth-doped fiber 126 is shorter compared to the conventional case, if the output of pumping light beam p generated by laser diode 122 is as much as that in the conventional optical fiber amplifier, pumping light beam P will remain on fourth optical line 127 together with optical signal S.

Second multiplexer 128 divides optical signal S and pumping light beam P on the basis of their wavelengths, and couples them to fifth and sixth optical lines 129 and 130, respectively. Pumping light beam P propagated through sixth optical line 130 is coupled to a reflection loop 132 through a first tap coupler 131, with hardly having loss. Then, pumping light beam P is looped back by reflection loop 132 to be coupled to first tap coupler 131 again. First tap coupler 129 divides pumping light beam P looped back by reflection loop 132 in a predetermined ratio, for example, 99:1, and couples each of the divided portions to sixth and seventh optical lines 130 and 133, respectively. The portion of pumping light beam P coupled to sixth optical line 130 is coupled to second multiplexer 128 as its input. Then, second multiplexer 128 sends pumping light beam P to rare-earth-doped fiber 126 through fourth optical line 127. The portion of pumping light beam P coupled to seventh optical line 133 by first tap coupler 131 is applied to a first photodiode 134, photoelectric-converted, and then applied to control circuit 140 as a monitor signal.

Optical signal S coupled to fifth optical line 129 by second multiplexer 128 is coupled to a second tap coupler 136 through an isolator 136 which blocks a reflective optical signal. Second tap coupler 136 divides optical signal S in a predetermined ratio, for example, 99:1, and couples each of the divided portions to eighth and ninth optical lines 137 and 138, respectively. The portion of optical signal S coupled to eighth optical line 137 is transmitted as an output signal, and the portion of optical signal S coupled to ninth optical line 138 is photoelectric-converted by a second photodiode 139, to be applied to control circuit 140 as a monitor signal.

Control circuit 140 controls the amount of operation current provided to laser diode 122 on the basis of the monitor signals applied from first and second photodiodes 134 and 139. That is, control circuit 140 controls the optical fiber amplifier in an optimum state, by reducing the amount of operation current supplied to laser diode 122 when the level of the monitor signal applied from first photodiode 134 is high, and increasing the operation current amount when the level of the monitor signal applied from second photodiode 139 is low.

In the optical fiber amplifier as constructed as above, input optical signal S and pumping light beam P generated by laser diode 122 are coupled with each other by first multiplexer 124 and applied to rare-earth-doped fiber 126 where pumping light beam P excites the rare earth ion doped thereto to generate stimulated photons with a predetermined wavelength. The stimulated photons are introduced to optical signal S and amplify it. Here, since the length of rare-earth-doped fiber 126 is set shorter compared to the conventional case, pumping light beam P remains in the output light beam from fiber 126. The residual pumping light beam is coupled to reflection loop 132 through second multiplexer 128, and looped back by the reflection loop to be recoupled to second multiplexer 128 through tap coupler 131. Second multiplexer 128 sends pumping light beam P to rare-earth-doped fiber through fourth optical line 127.

In the above-described optical fiber amplifier, pumping light beam P generated by laser diode 122 passes through rare-earth-doped fiber 126 at least twice. Accordingly, the length of fiber 126 can be remarkably reduced, compared to the fiber in the conventional optical fiber amplifier. Furthermore, the residual pumping light beam outputted from rare-earth-doped fiber 126 is coupled to reflection loop 132 through second multiplexer 128, looped back by the reflection loop, and reapplied to rare-earth-doped fiber 126 through second multiplexer 128. Accordingly, it is possible to prevent pumping light beam P from being transmitted through the optical fiber without establishing a separate mirror. Moreover, control circuit 140 controls the amplification efficiency of the optical fiber amplifier in an optimum state by controlling the output of laser diode 122 which generates pumping light beam P, based on the monitor signals applied from first and second photodiodes 134 and 130.

Figure 8:
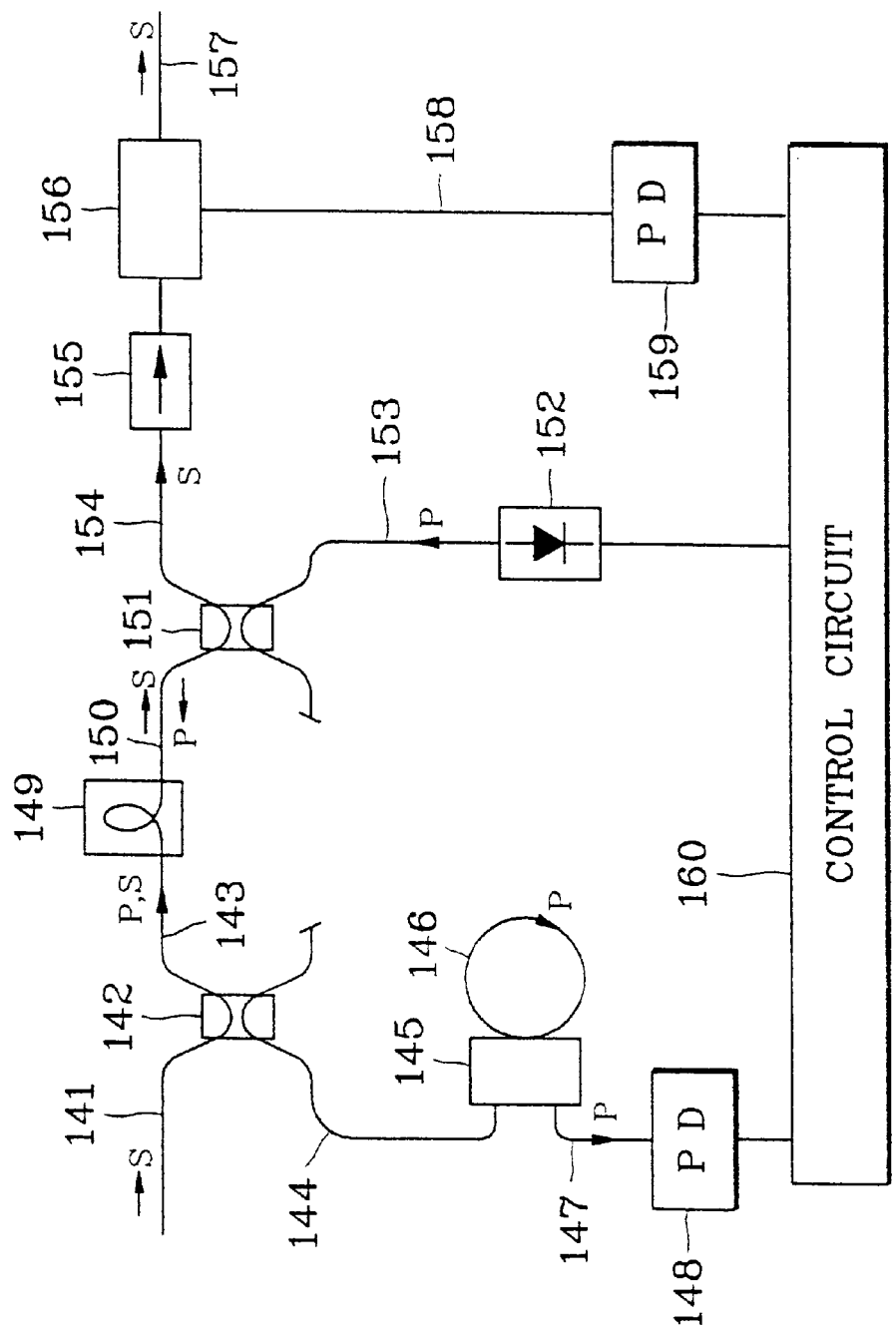
FIG. 8 shows a configuration of an optical fiber amplifier including a reflective loop according to a second embodiment of a second aspect of the present invention.

FIG. 8 shows a configuration of an optical fiber amplifier having a pumping light beam reflecting loop according to a second embodiment of the second aspect of the present invention, which employs reverse-direction excitation mode in which pumping light beam P is provided in a direction opposite to optical signal S, in contrast to the forward-direction excitation mode of the first embodiment in which pumping light beam P and optical signal S are provided in the same direction. Referring to FIG. 8, input optical signal S is coupled to a first optical line 141 which is connected to a first wavelength division multiplexer 142 as its input. First multiplexer 142 couples pumping light beam P applied thereto through a second optical line 143 to a third optical line 144, and also couples pumping light beam P applied through third optical line 144 to optical signal S applied through first optical line 141, to send them to second optical line 143.

Pumping light beam P coupled to third optical line 144 by first multiplexer 142 is coupled to a reflection loop 146 through a first tap coupler 145, with hardly having loss, looped back by the reflection loop, to be coupled to first tap coupler 145 again. First tap coupler 145 divides pumping light beam P looped back by reflection loop 146 in a predetermined ratio, for example, 99:1, and couples each of divided portions to third and fourth optical lines 144 and 147, respectively. The portion of pumping light beam P coupled to third optical line 146 is reapplied to first multiplexer 142 as its input. Accordingly, the light beam coupled to second optical line 143 by first multiplexer 142 includes optical signal S inputted through first optical line 141 and pumping light beam looped back by reflection loop 146. The portion of pumping light beam P coupled to fourth optical line 147 by first tap coupler 145 is sent to a first photodiode 148, photoelectric-converted, and then applied to a control circuit 160 as a monitor signal. Optical signal S and reflected pumping light beam P which are coupled to second optical line 143 are applied to a rare-earth-doped fiber 149 whose output light beam is coupled to second wavelength multiplexer 151 as its input, through a fifth optical line 150.

In this second embodiment of the second aspect of the invention, as optical signal S, for example, a light beam with a wavelength of 1520 to 1570 nm is used, and light beam with a wavelength of 980 or 1480 nm is used as pumping light beam P. The fiber 149 is doped with a rare earth ion, for example, Er, and its length is set to half the fiber length in the conventional optical fiber amplifier. In FIG. 8, reference numeral 152 denotes a laser diode which generates a pumping light beam P with a predetermined wavelength under the control of control circuit 160. Pumping light beam P generated by laser diode 152 is coupled to a sixth optical line 153 connected to second multiplexer 151 as its input. Second multiplexer 151 couples pumping light beam P received through sixth optical line 153 to fifth optical line 150 to provides it to rare-earth-doped fiber 149 as an exciting light beam.

Optical signal S from second multiplexer 151 is coupled to a seventh line 154 which is connected to a second tap coupler 156 through an isolator 155 which blocks a reflective optical signal. Second coupler 156 divides optical signal S in a predetermined ratio, for example, 99:1, and couples each of the divided portions to eighth and ninth optical lines 157 and 158, respectively. The portion of optical signal coupled to eighth optical line 157 is transmitted as an output signal, and the portion of the optical signal coupled to ninth optical line 158 is photoelectric-converted through a second photodiode 159, to be provided to control circuit 160 as a monitor signal.

Control circuit 160, similar to the first embodiment, controls the amount of operation current supplied to laser diode 152 on the basis of the monitor signals applied through first and second photodiodes 148 and 159, in such a manner that the amount of the operation current is reduced when the level of the monitor signal applied from first photodiode 148 is high, and the operation current amount is increased when the level of the monitor signal applied from second photodiode 159 is low, thereby controlling the optical fiber amplifier in an optimum state.

In the optical fiber amplifier according to the second embodiment of the second aspect of the invention, pumping light beam P generated from laser diode 152 is sent to rare-earth-doped fiber 149 through second multiplexers 151, and excites the rare earth ion doped thereinto to generate stimulated photons with a predetermined wavelength which are introduced to optical signal S inputted through first multiplexer 142 and being transmitted through fiber 54, thus amplifying optical signal S.

Furthermore, since the length of rare-earth-doped fiber 149 is remarkably reduced compared to the conventional case, a portion of pumping light beam P remains in the output light beam from rare-earth-doped fiber 149. And the residual pumping light beam is sent to reflection loop 146 through first multiplexer 142. The residual pumping light beam P looped back to reflection loop 146 is coupled to first multiplexer 142 through tap coupler 145, and first multiplexer 142 provides the looped pumping light beam to rare-earth-doped fiber 149, recoupling it to second optical line 143. Control circuit 160 controls the output of laser diode 152 on the basis of the monitor signals from first and second photodiodes 148 and 159. Accordingly, the electric power efficiency of the optical fiber amplifier can be optimized as well as rare-earth-doped fiber 149 can be shortened.

Figure 9:
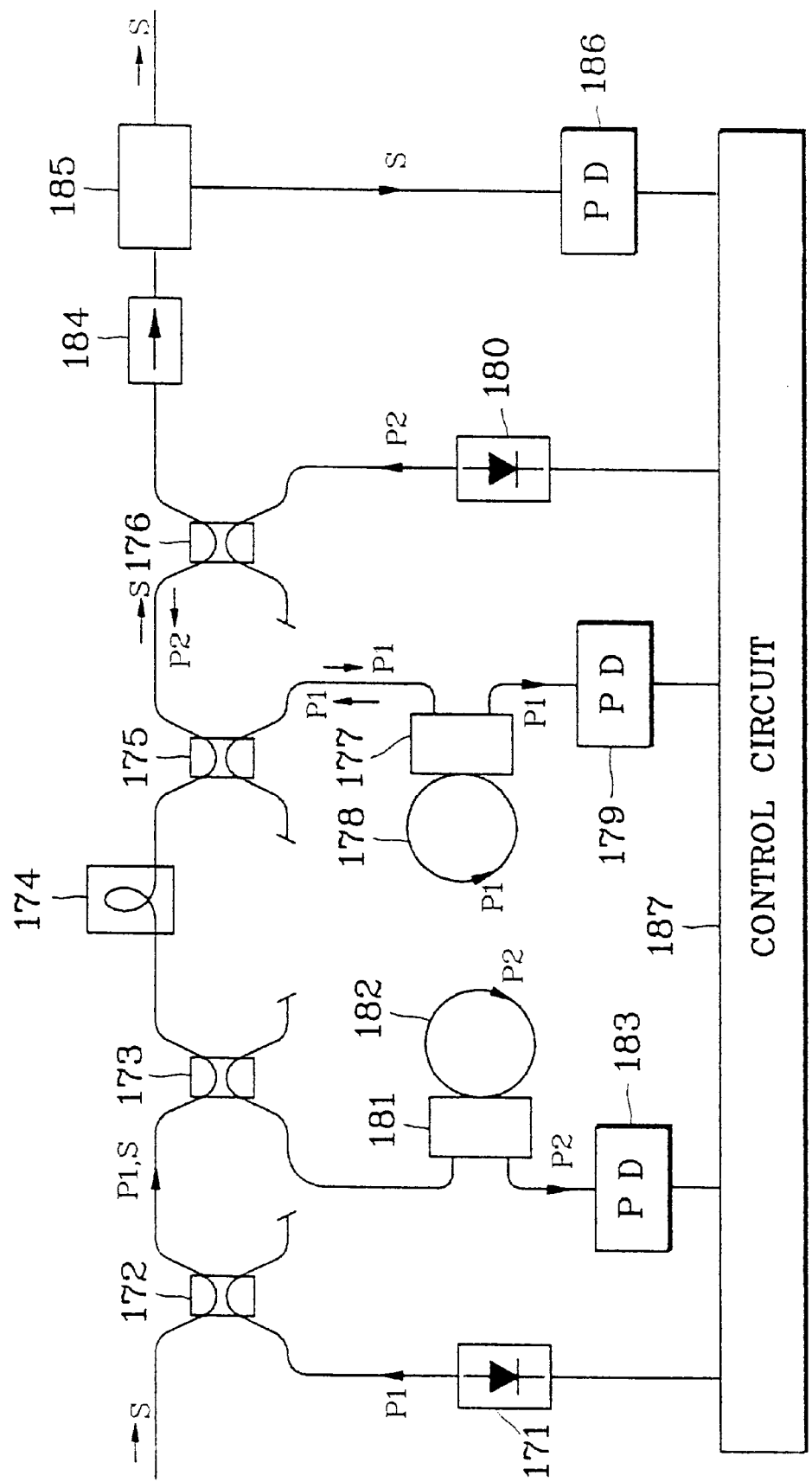
FIG. 9 shows a configuration of an optical fiber amplifier including a reflective loop according to a third embodiment of a second aspect of the present invention.

FIG. 9 shows a configuration of an optical fiber amplifier including a pumping light beam reflecting loop according to a third embodiment of the second aspect of the present invention, which employs bidirectional excitation mode. Referring to FIG. 9, input optical signal S and first pumping light beam P1 generated by a first laser diode 171 are coupled with each other by a first wavelength division multiplexer 172, pass through a second wavelength division multiplexer 173, with hardly having loss, and then applied to a rare-earth-doped fiber 174. The length of fiber 174 is set to half the fiber length in the conventional optical fiber amplifier. Optical signal S outputted from rare-earth-doped fiber 174 passed through third and fourth wavelength multiplexers 175 and 176, with hardly having loss.

The residual first pumping light beam P1 outputted from rare-earth-doped fiber 174 is wavelength-divided by third multiplexer 175 and coupled to a first reflection loop 178 through a first tap coupler 177. The residual first pumping light beam P1 looped back by first reflection loop 178 is recoupled to third multiplexer 175 through first tap coupler 177 to be provided to rare-earth-doped fiber 174. First tap coupler 177 divides first pumping light beam P1 looped back by first reflection loop 178 in a predetermined ratio, for example, 99:1, and applies a portion of the divided first pumping light beam to a first photodiode 179. The portion of first pumping light beam P1 is photoelectric-converted by first photodiode 179 to be applied to a control circuit 187 as a monitor signal.

A second pumping light beam P2 generated by a second laser diode 180 is coupled to the input of fourth multiplexer 176, to be supplied to rare-earth-doped fiber 174 through third multiplexer 175. The residual second pumping light beam P2 outputted from the rare-earth-doped fiber 174 is wavelength-divided by second multiplexer 173 and coupled to a second reflection loop 182 through a second tap coupler 181. Then, the residual second pumping light beam P2 is looped back by second reflection loop 182, and coupled to the input of second multiplexer 173 as its input through second tap coupler 181, to be provided to rare-earth-doped fiber 174.

Second tap coupler 181 divides second pumping light beam P2 in a predetermined ratio, for example, 99:1, and applies a portion of the divided second pumping light beam to a second photodiode 183 which photoelectric-converts the received pumping light beam and provides it to control circuit 187 as a monitor signal. Optical signal S outputted from fourth multiplexer 176 is coupled to a third tap coupler 185 through an isolator 184 which blocks a reflective optical signal. Third tap coupler 185 divides optical signal S outputted from isolator 84 in a predetermined ratio, for example, 99:1, and applies a portion of the divided optical signal to a third photodiode 186 which photoelectric-converts the received optical signal and provides it to control circuit 187 as a monitor signal.

Control circuit 187 controls the amount of operation current supplied to first and second laser diodes 171 and 183 on the basis of the monitor signals provided through first, second and third photodiodes 179, 183 and 186. That is, control circuit 187 controls the optical fiber amplifier in an optimum state, by reducing the amount of operation current supplied to first or second laser diode 171 and 180 when the level of the monitor signal provided from corresponding first or second photodiode 179 or 180 is high, and increasing the operation current amount when the level of the monitor signal provided from third photodiode 186 is low.

As described above, optical signal S is applied to rare-earth-doped fiber 174 through first and second multiplexers 172 and 173. Here, as an exciting signal for rare-earth-doped fiber 174, first pumping light beam P1 generated by first laser diode 171 is provided to the rare-earth-doped fiber 174 through first and second multiplexers 172 and 173, and second pumping light beam P2 generated by second laser diode 180 is also provided to the rare-earth-doped fiber 174 through fourth and third multiplexers 176 and 175. Here, first and second pumping light beams P1 and P2 have the same wavelength.

The length of rare-earth-doped fiber 174 is set shorter than that of the conventional optical fiber amplifier. Accordingly, when the outputs of first and second laser diodes 171 and 180 are as much as those of the conventional optical fiber amplifier, first and second pumping light beams P1 and P2 are not all consumed but remain in rare-earth-doped fiber 174. The residual light beams of first and second pumping light beams P1 and P2 are respectively wavelength-divided by third and second multiplexers 175 and 173, to be coupled to first and second reflection loop 178 and 182. Then, the residual pumping light beams P1 and P2 looped back by reflection loops 178 and 182 are reapplied to rare-earth-doped fiber 174 through third and second multiplexers 175 and 173. This reflection operation for first and second pumping light beams P1 and P2 is continuously performed when the pumping light beam is not all consumed but remains in rare-earth-doped fiber 174.

When first and second pumping light beams P1 and P2 are provided to rare-earth-doped fiber 174, stimulated photons are emitted from rare-earth-doped fiber 174 to be introduced to optical signal S being transmitted therethrough to be amplified. Control circuit 187 controls the amplification efficiency of the optical fiber amplifier in an optimum state, controlling the output of first and second laser diodes 171 an 180, based on the monitor signals supplied from first, second and third photodiodes 179, 183 and 186.

In the third embodiment, the pumping light beam outputted from rare-earth-doped fiber 174 is reflected thereto through the reflection loop, and this reflection is repeatedly carried out through first and second reflection loops 178 and 182. Accordingly, the length of fiber 174 can be reduced to below half the fiber length in the conventional optical fiber amplifier. Furthermore, the residual pumping light beam outputted from rare-earth-doped fiber 174 is continuously reprovided thereto through first and second reflection loops 178 and 182, for complete consumption of the pumping light beam. Here, the amount of the pumping light beam reprovided to fiber 174 is detected by first and second photodiodes 179 and 183, and the output powers of first and second laser diodes 171 and 180 are controlled on the basis of the detected signal, thereby setting the power efficiency of the optical fiber amplifier in an optimum state.

As described above, according to the present invention, the length of the rare-earth-doped fiber used in the optical fiber amplifier can be remarkably reduced. Furthermore, the pumping light beam is completely consumed in the rare-earth-doped fiber, to improve the amplification efficiency of the optical fiber amplifier, and to prevent the residual pumping light beam from being transmitted through the optical lines.

It will be apparent to those skilled in the art that various modifications and variations can be made in the optical fiber amplifier of the present invention without departing from the spirit or scope of the invention. Thus, it is intended that the present invention cover the modifications and variations of this invention provided they come within the scope of the appended claims and their equivalents.

What is claimed is:

1. An optical fiber amplifier, comprising:
   an optical line through which an optical signal is transmitted;
   a rare-earth-doped fiber, doped with a predetermined rare earth ion, being set on the optical line;
   a pumping light beam source for generating a pumping light beam having a predetermined wavelength;
   a first multiplexer for coupling the pumping light beam to the optical line;
   a second multiplexer for separating the pumping light beam outputted through the rare-earth-doped fiber from the optical signal; and
   pumping light beam feedback means for looping a portion of the separated pumping light beam back to the same rare-earth-doped fiber.

2. The optical fiber amplifier as claimed in claim 1, wherein the pumping light beam coupled to the optical line by the first multiplexer is transmitted in the same direction as the optical signal.

3. The optical fiber amplifier as claimed in claim 1, wherein the pumping light beam coupled to the optical line by the first multiplexer is transmitted in a direction opposite to the optical signal.

4. The optical fiber amplifier as claimed in claim 1, further comprising:
   pumping light beam detection means for detecting the amount of the pumping light beam which is looped back to the rare-earth-doped fiber through the feedback means; and
   control means for controlling the output level of the pumping light beam source on the basis of the amount of the pumping light beam detected by the pumping light beam detection means.

5. The optical fiber amplifier as claimed in claim 1, further comprising:
   optical signal detection means for detecting the amount of the optical signal amplified through the rare-earth-doped fiber; and
   control means for controlling the output level of the pumping light beam source on the basis of the amount of the optical signal detected by the optical signal detection means.

6. An optical fiber amplifier including a pumping light beam feedback loop comprising:
   a first optical line through which an optical signal is transmitted;
   a rare-earth-doped fiber, doped with a predetermined rare earth ion, being set on the optical line;
   a first pumping light beam source for generating a first pumping light beam having a predetermined wavelength;
   a second pumping light beam source for generating a second pumping light beam having a predetermined wavelength;
   a first multiplexer for coupling the first pumping light beam to the optical signal transmitted through the optical line, the first pumping light beam and optical signal being transmitted in the same direction;
   a second multiplexer for coupling the second pumping light beam to the optical signal transmitted through the optical line, the second pumping light beam being transmitted in a direction opposite to the optical signal;
   a third multiplexer for dividing the pumping light beam which is outputted through the rare-earth-doped fiber and transmitted in the same direction as the optical signal;
   a fourth multiplexer for dividing the pumping light beam which is outputted through the rare-earth-doped fiber and transmitted in a direction opposite to the optical signal; and
   a second optical line optically coupled to the third and fourth multiplexers,
   wherein the third and fourth multiplexers output the divided pumping light beam through the second optical line, and couple the pumping light beam received through an optical line to the first optical line.

7. The optical fiber amplifier as claimed in claim 6, further comprising:
   pumping light beam detection means for detecting the amount of the pumping light beam transmitted through the second optical line; and
   control means for controlling the output level of the first and second pumping light beam sources on the basis of the amount of the pumping light beam detected by the pumping light beam detection means.

8. The optical fiber amplifier as claimed in claim 6, further comprising:
   optical signal detection means for detecting the amount of the optical signal amplified through the rare-earth-doped fiber; and
   control means for controlling the output level of the first and second pumping light beam sources on the basis of the amount of the optical signal detected by the optical signal detection means.

9. An optical fiber amplifier including pumping light beam feedback means, comprising:
   an optical line through which an optical signal is transmitted;
   a rare-earth-doped fiber, doped with a predetermined rare earth ion, being set on the optical line;
   a plurality of pumping light beam sources each of which generates a pumping light beam having a predetermined wavelength;
   a plurality of light beam coupling multiplexers for coupling the pumping light beam to the optical line;
   a plurality of light beam dividing multiplexers for dividing the pumping light beam outputted through the rare-earth-doped fiber; and
   pumping light beam feedback means for looping the pumping light beam divided by the light beam dividing multiplexers back to the same rare-earth-doped fiber.

10. An optical fiber amplifier including a pumping light beam reflection loop, comprising:
    an optical line through which an optical signal is transmitted;
    a rare-earth-doped fiber, doped with a predetermined rare earth ion, being set on the optical line;
    a pumping light beam source for generating a pumping light beam having a predetermined wavelength;
    a first multiplexer for coupling the pumping light beam to the optical line; and
    pumping light beam looping means for dividing the pumping light beam outputted from the rare-earth-doped fiber, and providing it to the same rare-earth-doped fiber again.

11. The optical fiber amplifier as claimed in claim 10, wherein the pumping light beam looping means includes a second multiplexer connected to the optical line, and a reflection loop for reflective-looping a light beam outputted from the second multiplexer and coupling it to the second multiplexer as its input, the second multiplexer applying the pumping light beam which is transmitted through the optical line in a first direction to the reflection loop, and coupling a pumping light beam received from the reflection loop to the optical line in a direction opposite to the first direction.

12. The optical fiber amplifier as claimed in claim 10, wherein the pumping light beam coupled to the optical line by the first multiplexer is transmitted in the same direction as the optical signal.

13. The optical fiber amplifier as claimed in claim 10, wherein the pumping light beam coupled to the optical line by the first multiplexer is transmitted in a direction opposite to the optical signal.

14. The optical fiber amplifier as claimed in claim 10, further comprising:

pumping light beam detection means for detecting the amount of the pumping light beam looped back by the pumping light beam looping means; and control means for controlling the output level of the pumping light beam source on the basis of the amount of the pumping light beam detected by the pumping light beam detection means.

15. The optical fiber amplifier as claimed in claim 10, further comprising:

optical signal detection means for detecting the amount of the optical signal amplified through the rare-earth-doped fiber; and control means for controlling the output level of the pumping light beam source on the basis of the amount of the optical signal detected by the optical detection means.

16. An optical fiber amplifier including a pumping light beam reflection loop, comprising:

an optical line through which an optical signal is transmitted;

a rare-earth-doped fiber, doped with a predetermined rare earth ion, being set on the optical line;

a first pumping light beam source for generating a first pumping light beam having a predetermined wavelength;

a second pumping light beam source for generating a second pumping light beam having a predetermined wavelength;

a first multiplexer for coupling the first pumping light beam to the optical signal transmitted through the optical line, the first pumping light beam and optical signal being transmitted in the same direction;

a second multiplexer for coupling the second pumping light beam to the optical signal transmitted through the optical line, the second pumping light beam being transmitted in a direction opposite to the optical signal;

first pumping light beam looping means for dividing the pumping light beam which is outputted through the rare-earth-doped fiber and transmitted in the same direction as the optical signal, and providing it to the same rare-earth-doped fiber again; and second pumping light beam looping means for dividing the pumping light beam which is outputted through the rare-earth-doped fiber and transmitted in a direction opposite to the optical signal, and providing it to the same rare-earth-doped fiber again.

17. The optical fiber amplifier as claimed in claim 16, wherein the pumping light beam looping means including a multiplexer coupled to the optical line, and a reflection loop for reflective-looping a light beam outputted from the multiplexer and coupling it to the multiplexer as its input, the multiplexer applying the pumping light beam, transmitted through the optical line in a first direction, to the reflection loop, the multiplexer coupling the pumping light beam, received from the reflection loop, to the optical line in a direction opposite to the optical signal.

18. The optical fiber amplifier as claimed in claim 16 or 17, further comprising:

at least one pumping light beam detection means for detecting the amount of the pumping light beam looped back by the pumping light beam looping means; and control means for controlling the output level of the first and second pumping light beam sources on the basis of the amount of the pumping light beam detected by the pumping light beam detection means.

19. The optical fiber amplifier as claimed in claim 16, further comprising:

optical signal detection means for detecting the amount of the optical signal amplified through the rare-earth-doped fiber; and control means for controlling the output level of the first and second pumping light beam sources on the basis of the amount of the optical signal detected by the optical signal detection means.

* * * * *